G. A. PARMENTER.
FENDER OR GUARD FOR RAILWAY CARS.
APPLICATION FILED MAY 15, 1908.

921,882.

Patented May 18, 1909.

UNITED STATES PATENT OFFICE.

GEORGE A. PARMENTER, OF BOSTON, MASSACHUSETTS.

FENDER OR GUARD FOR RAILWAY-CARS.

No. 921,882.      Specification of Letters Patent.      Patented May 18, 1909.

Application filed May 15, 1908. Serial No. 433,111.

*To all whom it may concern:*

Be it known that I, GEORGE A. PARMENTER, a citizen of the United States, residing at Boston, Massachusetts, have invented certain new and useful Improvements in Fenders or Guards for Railway-Cars, of which the following is a specification.

My present invention relates to improvements in fenders or guards for railway cars of the type known as trip and drop scoop, and in which the scoop is carried by a swinging truck while the trip device is suspended from the car body.

I have aimed in devising my invention to simplify the operation of the scoop or guard, to avoid as far as possible the use of parts liable to work loose under vibration and to simplify the work of adjustment of the parts.

With these and other objects in view the invention includes the features of construction and arrangement and combination of parts hereinafter described and particularly set forth in the appended claims.

An embodiment of my invention is shown in the accompanying drawings, in which:—

Figure 1:
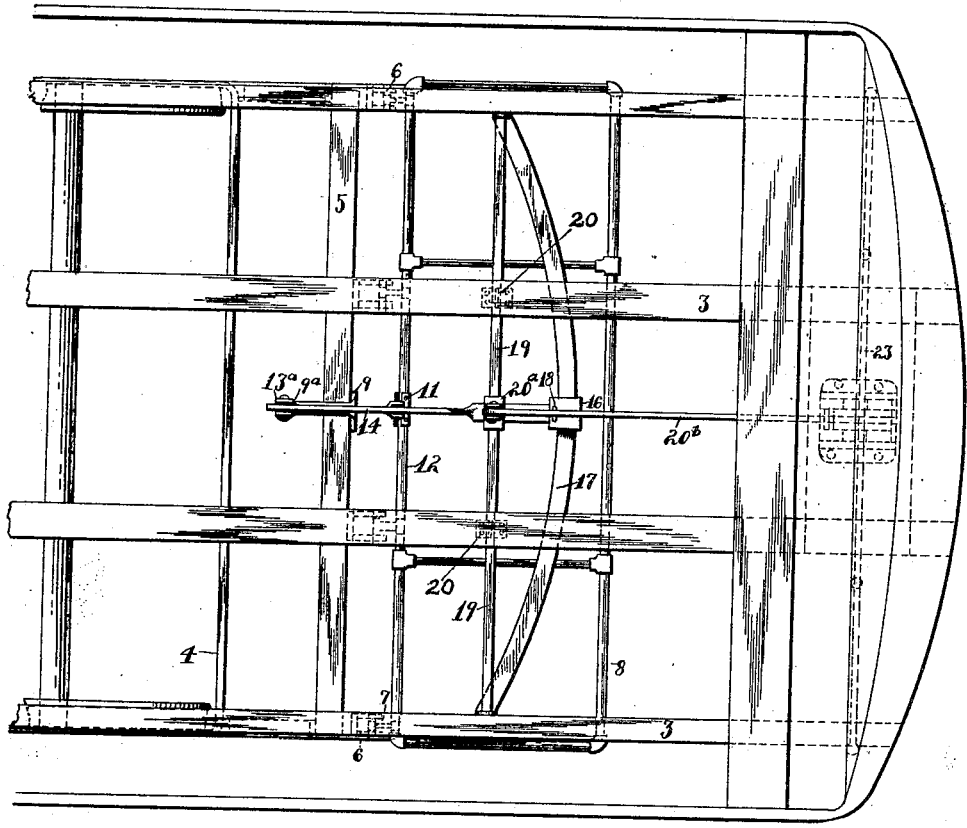
Figure 2:
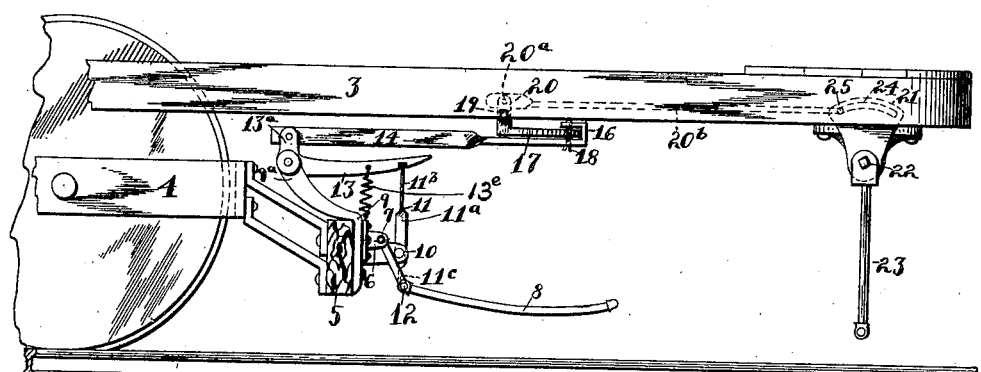

Figure 1 is a plan view, and Fig. 2 a side elevation, a sufficient portion of the truck and car body being shown to illustrate the application of the improved fender thereto.

Referring by reference characters to this drawing, the numerals 3, 3, designate the sills of the car body and 4 the truck frame. The usual front cross bar is shown at 5 to the front face of which, near each end, are secured brackets 6 to which the extensions 7 of the scoop are removably connected by pivot pins.

A bracket 9 is bolted to the front side of the cross bar 5 and in a bearing 10 projecting from the front side of this bracket is pivotally mounted a lever 11 which is preferably formed of a bar of spring metal having its central portion $11^a$ twisted or bent into a plane at right angles to the upper and lower portions $11^b$ and $11^c$. This makes the said upper and lower portions elastic or yielding to a certain extent with a rigid central portion due to said central portion being located edgewise to the line of strain.

The lower end $11^c$ of the bar 11 bears against the rear side of the lower portion or cross bar 12 of the fender while the upper end $11^b$ engages a notch in a latch lever 13, which, when the parts are in the position shown in Fig. 2, holds the scoop elevated. The latch lever 13 is in the form of a bell crank lever pivoted in the rearwardly extended arm $9^a$ of the bracket 9, and the arm $13^a$ of this latch lever is connected by a link 14 with a radius bar 17.

The link 14 may conveniently be made of a flat bar of metal having its forward end turned or twisted into a plane at right angles to the body portion and bent around or back upon itself as indicated at 16 to form a recess to receive the radius bar 17 which may be confined therein by a pin 18. This radius bar is curved on an arc of a circle concentric with the vertical axis of the truck and is supported from the car body by a square rod 19 mounted in bushings journaled in brackets 20, the ends of the radius bar having square sockets to receive the ends of the bar 19. An arm $20^a$ carried by this bar is connected by a rod or link $20^b$ with an arm 21 carried by the upper bar or rock shaft 22 of the trip frame 23.

The arm 21 is preferably of segmental shape and provided with an arc shaped slot 24 engaged by a transverse projection or pin 25 on the front end of the rod $20^b$. This connection is made so that the trip may be swung forward and up into horizontal position and thus held so as to not be operative to trip the scoop should this be rendered desirable by the presence of snow on the track or similar conditions.

From the foregoing description it is thought the operation of my invention will be obvious. Suffice it to say that in case the trip frame 23 encounters an obstacle it will be swung rearwardly and through rod $20^b$ will rock shaft 19 causing the radius bar to push rearwardly on rod 14 and lifting latch lever 13 upward against the tension of spring $13^e$, disengage it from the upper end of lever 11 allowing the scoop to drop.

It will be obvious that this operation will take place as readily on curves as on a straight stretch of track as the radius bar simply slides through the end of link 14 as the car body and truck swing in relation to each other in rounding curves.

It will be seen that the connections are all positive connections so that the contact of the trip frame with an obstacle causes instant release of the scoop, while the elasticity of the bar or lever 11 allows sufficient yield to the scoop to relieve the scoop of the strain due to the jolts and jars caused by inequalities in the track.

Having thus described my invention, what I claim is:—

1. The combination with a car body and truck frame, of a scoop pivotally supported from the truck frame, a resilient member connected with said scoop, a latch for engaging said resilient member to hold the scoop elevated, and a trip frame having connections for operating said latch.

2. The combination with a car body and truck frame, of a scoop pivotally supported from the truck frame, a resilient lever pivoted to the truck frame and having one part engaging the scoop, a latch engaging another part of the lever for holding the scoop elevated, and a trip frame having connections to the latch for disengaging the same from the resilient lever.

3. The combination with a car body and truck frame, of a scoop pivotally carried by the truck frame, a resilient lever pivoted to the truck frame and having its lower end adapted to hold the scoop elevated, a latch lever adapted to engage the upper end of said resilient lever, a trip frame, and operating connections between the trip frame and latch lever.

4. The combination with a car body and truck frame, of a scoop pivotally supported from the front of the forward cross bar of the truck frame, a resilient member also pivoted at the front of said cross bar and engaging the scoop to hold it elevated, a bracket connected to the front side of said cross bar and having a rearwardly extending upper portion, a latch lever pivotally carried by said rearwardly extended portion and engaging said resilient member, a trip frame, and operating connections between the trip frame and latch lever.

5. The combination with a car body and swiveled truck frame, of a scoop pivotally supported from said truck frame, a latch lever also supported by said truck frame and having detachable connections for holding the scoop elevated, a curved bar supported by the car body to have movement longitudinally thereof, a connecting member between the latch lever and curved bar, said member having a sliding engagement with the curved bar, a trip frame, and operating connections between the trip frame and curved bar.

6. The combination with a car body and swiveled truck frame, of a scoop pivotally supported from said truck frame, a latch lever carried by the truck frame and having detachable connection with the scoop, a curved bar supported from the car body and arranged to swing longitudinally thereof, a link having one end connected to the latch lever, and the other end slidingly connected to the curved bar, an arm or lever adapted to impart to said curved bar bodily movement longitudinally of the car body, a trip frame, and connections between the same and said arm or lever.

In testimony whereof, I affix my signature in presence of two witnesses.

GEORGE A. PARMENTER.

Witnesses:
BENJAMIN S. WELSCH,
MILDRED E. PARMENTER.